O. BOTHE & O. LÖSCHER.
SPEED INDICATOR.
APPLICATION FILED NOV. 23, 1909.
1,001,342.
Patented Aug. 22, 1911.
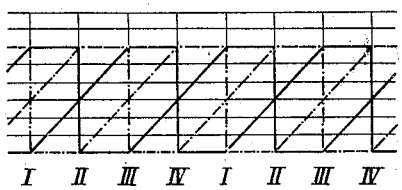
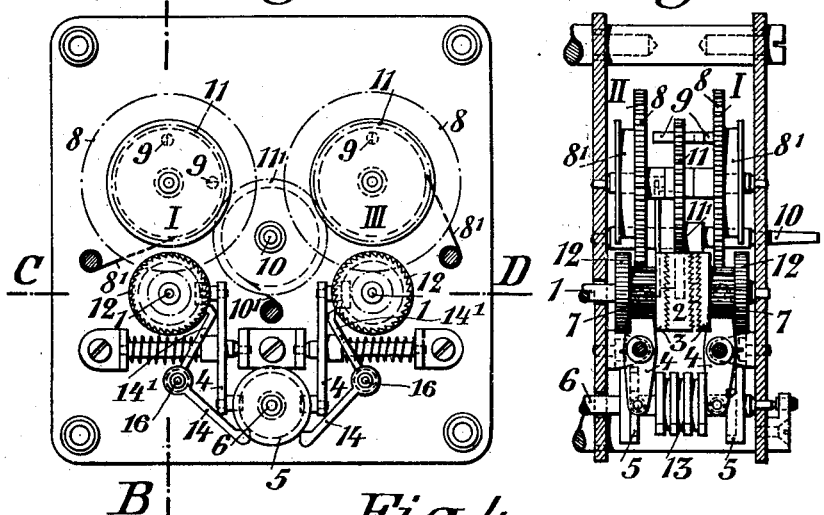
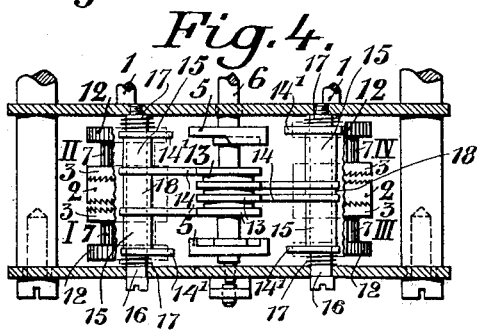
WITNESSES
J. A. Cook
John Murtagh
INVENTORS
Otto Bothe
Otto Löscher
BY Goepel & Goepel
ATTORNEYS

UNITED STATES PATENT OFFICE.

OTTO BOTHE AND OTTO LÖSCHER, OF BERLIN, GERMANY.

SPEED-INDICATOR.

1,001,342. Specification of Letters Patent. Patented Aug. 22, 1911.

Application filed November 23, 1909. Serial No. 529,621.

*To all whom it may concern:*

Be it known that we, OTTO BOTHE, mechanical engineer, a subject of the German Emperor, residing at 2 Ackerstrasse, Berlin, Germany, and OTTO LÖSCHER, clerk, a subject of the German Emperor, residing at 20 Ackerstrasse, Berlin, Germany, have invented certain new and useful Improvements in Speed-Indicators; and we do hereby declare the following to be a full, clear, and exact description of the invention, such as will enable others skilled in the art to which it appertains to make and use the same.

This invention relates to improvements in speed indicators, and more particularly to improvements in that class of indicators in which the indicating device, such as an indicating finger or pointer, is set by means of a plurality of setting elements which are successively connected with the object the speed of which is to be ascertained. When using such indicators for indicating the speed for motor cars, it is necessary, in order to obtain more rapid and accordingly more correct indications, to make such measurements by means of the setting elements very frequently, because the speed of such motor cars is subjected to rapid changes.

The object of the improvements is to provide a speed indicator of the class described in which such frequent measurements by means of the setting elements are made without reducing the time of coöperation of the individual setting elements with the shaft of the motor car, and without increasing the speed of the setting elements, while at the same time one of the setting elements is always in position to hold the indicating device or pointer in its set position.

With this object in view the invention consists of the matters described hereinafter and particularly pointed out in the appended claims.

For the purpose of explaining the invention an example embodying the same has been shown in the accompanying drawing, in which the same numerals of references have been used in all the views to indicate corresponding parts.

In said drawing Figure 1, is a diagram illustrating the coöperation of the setting elements of the apparatus illustrated in Figs. 2 to 4 with each other, with the pointer of the indicator, and with the shaft the speed of which is to be ascertained, Fig. 2, is a plan of the apparatus, the cover of the casing being removed, Fig. 3, is a vertical cross-section of Fig. 2 taken on the line A—B, and Fig. 4, is a horizontal cross-section of the apparatus taken on the line C—D of Fig. 2.

In the example illustrated four setting elements are provided which are adapted to be successively coupled to the shaft the speed of which is to be measured. For the sake of convenience the latter will be termed the driving shaft or the driving element in the following description and in the claims. As shown in the drawing, a pair of rotary shafts 1, 1 are loosely mounted in the walls of the casing of the apparatus, and the said shafts are operatively connected with the said driving shaft, the connection being such that both shafts 1, 1 rotate in the same direction. Each of the said shafts carries a ratchet disk 2, 2 which is rigidly secured thereto, so that it partakes of the rotation of the shaft. On both faces, the disks 2, 2 are formed with ratchet teeth. Loosely mounted on each of the shafts 1, 1 there are a pair of longitudinally slidable ratchet disks 3, 3 which are adapted to be successively coupled to the shafts 1, 1 and to be rotated thereby by the engagement of their ratchet teeth with the teeth provided on the disks 2, 2. The ratchet disks 3, 3 the number of which in the example is four, are controlled by levers 4, 4 which are adapted to be rocked by cam disks 5, 5 rigidly secured to a shaft 6. The latter is mounted in the walls of the casing and it is adapted to be uniformly rotated by means of a suitable clock mechanism (not shown in the drawing). By means of the said cam disks the four ratchet disks 3 are successively coupled to the disks 2 and the shafts 1. Rigidly secured to each of the ratchet disks 3 is a spur gear 7 which is in mesh with a rotary spur gear 8. A spring 8′ tends to rotate the latter in opposition to the rotary movement imparted to the spur gear by the gear 7. The spur gears 8, 8 are arranged in pairs, and the gears of each pair are adapted to act on the same spur gear 11 and to advance the same by means of pins 9, 9 projecting laterally from the spur gears 8, 8 and 11, and the spur gear 11 is in mesh with a spur gear 11′ mounted on the arbor 10 of the speed indicating pointer. A spring 10′ tends to turn the arbor 10 and the spur gear 11′ in opposition to the rotary movement imparted thereto by the spur gear 11. By the combined action of the spring 10' and the spur gear 11' successively acted upon by the disks 3 the indicating pointer is set so as to indicate the speed of the shafts 1 and the driving shaft connected therewith.

Pawls 14 are mounted on sleeves 15 which turn loosely on the shafts 16, two of which pawls are placed on the same shaft and are separated the proper position from each other by spacing collars 18. The sleeve 15 of each pawl 14 is provided at its opposite end with a pawl 14' which engages a ratchet wheel 12. Springs 17 press the pawls 14' into engagement with the ratchet wheels 12, while the levers 14 are adjacent to the disks 13 and are actuated by the same.

Whenever one of the ratchet disks 3 has been coupled with its shaft 1 so as to transmit the rotary motion of the latter to the coöperating disk 11 and through the latter to the arbor 10 of the indicating pointer, it is again disconnected from its shaft 1 by means of its lever 4 controlled by the shaft 6. To prevent the gearing 7, 8, 11, 11' and the arbor 10 from being turned backward by the springs 10' and 8', the disk 3 is temporarily locked by means of the pawl 14' and the ratchet disk 12 secured to the spur gear 7. The pawl is thrown into engagement with the ratchet disk 12 as soon as the disk 3 is thrown out of engagement with the disk 2, for which purpose a cam disk 13 is secured to the shaft 6. The gearing 7, 8, 11 is not released from the locking pawl 14', so as to be moved into its inoperative position, before the following disk 3 which in the meantime had begun its operation on the shaft 10 has been disconnected from its disk 2 and locked by its pawl and ratchet mechanism 12, 14'.

The operation of the apparatus is as follows: If the setting element III has been coupled to the shaft the speed of which is to be ascertained, the element I which before was coupled to the said shaft is disconnected from the shaft 1 and held in locking position by its pawl 14', so that the shaft 10 can not be thrown backward by its spring 10'. Simultaneously the setting element IV which so far has been in its locking position is entirely released by its pawl 14', so that it is shifted by its spring 8' into its initial position, while the arbor of the indicating pointer is held in position by the element I. The relative paths of the four setting elements are illustrated in Fig. 1 in which the ordinates indicate the paths of the said elements and the abscissæ the time intervals. The position of the different elements just described is represented by the ordinate corresponding to the numeral III. The diagram of the element III which is shown in full lines indicates that this element, after passing through an inoperative interval has just been coupled to its shaft 1, so that it is rotated, and its diagram rises from the zero line. The element I has just performed its operative stroke, and it has arrived in its locked position, and the element II which before has been coupled to its shaft 1 has passed one half of its stroke, and it remains in engagement with the shaft 1 for completing the remaining half of its operative stroke. As soon as it arrives at the end of its operative stroke, the operation of the elements is repeated. If, by reason of a decrease of the speed of the driving shaft and the shafts 1, one of the setting elements (in the position of the parts referred to, the element II), is not advanced to the same extent as the previously operative element (I) which is holding the arbor 10 in position, the latter will be turned backward accordingly, until it comes into engagement with the operative element (II). And if the speed of the shaft 1 is increased, the operative element (II) shifts the said arbor 10 forward.

As the time during which each setting element is operative is constant (the controlling shaft 6 being continuously driven by a clock mechanism), the extent of the rotation of the said element is a measure for the speed of the shaft 1, and the said rotation is indicated by the pointer of the indicating arbor 10.

By the arrangement described frequent measurements can be taken. And this is effected by making the period of time during which the setting elements are in their locking positions and the period of time during which they are in their inoperative positions shorter than the period of time during which the said elements are coupled to the driving shaft. In the example described the period of time during which the setting elements are in their inoperative and in their locking positions are one half of the period of time during which the said elements are coupled to the driving shaft. Under these circumferences four setting elements are required in order to provide a constant support for the indicating pointer, as appears from the diagram. And from the said four setting elements result an increase in the number of the measurements of the speed, and therefore more accurate results.

Having now particularly described and ascertained the nature of our said invention and in what manner the same is to be performed, we declare that what we claim is:—

1. In a speed-indicator, the combination with the indicating arbor, of four setting elements adapted to be moved by the driving element the speed of which is to be ascertained and to set the indicating element, means to couple said setting arbor successively and during like periods of time to said driving element, locking means for each of said setting elements operative when uncoupling the same from the driving element, and means to unlock said setting elements, the operations of coupling, locking and releasing said setting elements succeeding one another in such a way, that when coupling one setting element with the driving shaft a previously locked element is released to move into its inoperative position, and a previously coupled element has to complete one half of its stroke, while the setting element which has been coupled before the element completing its stroke is locked in its position.

2. In a speed indicator the combination of two clutch shafts adapted to rotate in the same direction in connection with the shaft whose speed is to be registered, double clutches on said shafts respectively, a clock-actuated intermediate shaft, cams on said intermediate shaft, shifting levers engaged by said cams for locking and releasing said clutches, spur gears on the sleeves of the sliding clutch members, an indicating arbor, and spring tensioned mechanisms between said spur gears and said indicating arbor.

3. In a speed indicator the combination of two rotary shafts adapted to rotate in the same direction in connection with the shaft whose speed is to be registered, double clutches on said shafts respectively, a clock-actuated intermediate shaft, cams on said intermediate shaft, shifting levers engaged by said cams for locking and releasing said clutches, spur gears on the sleeves of the sliding clutch members, intermittent locking mechanisms for said spur gears, an indicating arbor, and spring tensioned mechanisms between said spur gears and said indicating arbor.

4. In a speed indicator the combination of two rotary shafts adapted to rotate in the same direction in connection with the shaft whose speed is to be registered, double clutches on said shafts respectively, a clock-actuated intermediate shaft, cams on said intermediate shaft, shifting levers engaged by said cams for locking and releasing said clutches, spur gears on the sleeves of the sliding clutch members, intermittent locking mechanisms for said spur gears, consisting of ratchet disks fixed to said spur gears, pawls engaging said ratchet disks and cams on said intermediate shaft for actuating said pawls at proper intervals, an indicating arbor, and spring tensioned mechanisms between said spur gears and said indicating arbor.

5. In a speed indicator the combination of two clutch shafts adapted to rotate in the same direction in connection with the shaft whose speed is to be registered, double clutches on said shafts respectively, a clock-actuated intermediate shaft, cams on said intermediate shaft, shifting levers engaged by said cams for locking and releasing said clutches, spur gears on the sleeves of the sliding clutch members, two shafts disposed parallel with said clutch shafts, two spur gears on each of said parallel shafts meshing with said clutch member spur gears and provided with lateral pins, an indicating arbor, spur gears on said indicating arbor provided with lateral pins engaged at intervals by the lateral pins of the spur gears last mentioned, and springs for imparting reverse tension to said gearing.

6. In a speed indicator the combination of an indicating arbor carrying two spur gears, two shafts adjacent to said indicating arbor and parallel therewith, two spur gears on each of said parallel shafts, one gear of each of said parallel shafts meshing with the same gear on the indicating arbor, said gears being provided with laterally projecting pins whereby the spur gears of the parallel shafts engage at proper intervals the spur gears of the indicating arbor, and means for actuating the gears of the parallel shafts in succession.

In testimony, that we claim the foregoing as our invention, we have signed our names in presence of two subscribing witnesses.

OTTO BOTHE.
OTTO LÖSCHER.

Witnesses:
  Henry Hasper,